(12) United States Patent
Kimoto (10) Patent No.: US 11,932,732 B2
(45) Date of Patent: Mar. 19, 2024

(54) BINDER, METHOD FOR MANUFACTURING SAME AND METHOD FOR MANUFACTURING CASTING SAND MOLD

(71) Applicant: DIC Corporation, Tokyo (JP)

(72) Inventor: Seiji Kimoto, Ichihara (JP)

(73) Assignee: DIC Corporation, Tokyo (JP)

( * ) Notice: Subject to any disclaimer, the term of this patent is extended or adjusted under 35 U.S.C. 154(b) by 448 days.

(21) Appl. No.: 17/048,801

(22) PCT Filed: Apr. 16, 2019

(86) PCT No.: PCT/JP2019/016273
§ 371 (c)(1),
(2) Date: Oct. 19, 2020

(87) PCT Pub. No.: WO2019/208322
PCT Pub. Date: Oct. 31, 2019

(65) Prior Publication Data
US 2021/0147605 A1 May 20, 2021

(30) Foreign Application Priority Data
Apr. 26, 2018 (JP) ................................. 2018-085172

(51) Int. Cl.
| C08G 8/08 | (2006.01) |
| B22C 1/22 | (2006.01) |
| B22C 9/02 | (2006.01) |
| B33Y 10/00 | (2015.01) |
| B33Y 70/00 | (2020.01) |

(52) U.S. Cl.
CPC .............. *C08G 8/08* (2013.01); *B22C 1/2253* (2013.01); *B22C 9/02* (2013.01); *B33Y 10/00* (2014.12); *B33Y 70/00* (2014.12)

(58) Field of Classification Search
CPC .......... C08G 8/08; B33Y 10/00; B33Y 70/00; B22C 1/2253; B22C 9/02
See application file for complete search history.

(56) References Cited

U.S. PATENT DOCUMENTS

2005/0075452 A1    4/2005  Inatomi et al.

FOREIGN PATENT DOCUMENTS

| JP | 2002-226535 A | 8/2002 |
| JP | 2005-169434 A | 6/2005 |
| JP | 2007-169457 A | 7/2007 |
| JP | 4398299 B2 | 1/2010 |
| JP | 2015-193035 A | 11/2015 |
| JP | 2015-205337 A | 11/2015 |
| JP | 2017-039813 A | 2/2017 |
| JP | 2017-048349 A | 3/2017 |

OTHER PUBLICATIONS

JP 2005 169434 machine translation (Year: 2005).*
JP 2007 169457 machine translation (Year: 2007).*
Supplementary European Search Report completed Dec. 11, 2021, issued for European Patent Application No. 19791752.9.

* cited by examiner

*Primary Examiner* — Edward J Cain
(74) *Attorney, Agent, or Firm* — Locke Lord LLP (57) ABSTRACT

Provided are a binder in the producing of a casting sand mold according to an ink jet type lamination shaping method in which a binder is printed with respect to sand, a method for producing the binder, and a method for producing a casting sand mold using the binder. Specifically, provided are a binder useful for a casting sand mold of an ink jet type, containing: a resol-type phenolic resin that is obtained by reacting aldehydes (A1), phenols (P1), and a compound (N) having two or more phenolic hydroxyl groups in one molecule or by reacting the aldehydes (A1) and a novolac-type phenolic resin (N1), in the presence of an alkali catalyst, and has a dispersion degree (Mw/Mn) of 1.0 to 3.5 and a phenolic monomer residue of 5% or less, a method for producing the binder, and a method for producing a casting sand mold.

8 Claims, 7 Drawing Sheets

BINDER, METHOD FOR MANUFACTURING SAME AND METHOD FOR MANUFACTURING CASTING SAND MOLD

TECHNICAL FIELD

The present invention relates to a method for producing a casting sand mold according to an ink jet type lamination shaping method in which a binder is printed with respect to sand, the binder used therein, and a method for producing the binder.

BACKGROUND ART

Recently, a product having a complicated shape that was difficult to cast in the related art can be cast by preparing a sand mold that can be removed by being crushed after being poured, in accordance with a rapid prototyping (RP) shaping method in which a dimension accuracy is excellent and a draft angle is not required, that is, a lamination shaping method. Among the lamination shaping methods, an ink jet type lamination shaping method in which a curable resin is used as a binder and is printed with respect to sand kneaded with a curing agent is capable of promptly shaping a large shaped object by using a large-size printer head, and thus, can also be applied to a large-size product, and is capable of advantageously producing a high-melting-point metal cast product having a large size and a complicated internal shape, such as a cylinder head for a large-size diesel engine can.

However, in such an ink jet type lamination shaping method, in a case where even a slight amount of impurities are mixed into sand used in the lamination shaping, shaping quality may be affected or a shaping apparatus may break down, and thus, expensive sand having a narrow particle size distribution has been used, and a technology for enabling the reuse of sand has been expected.

Therefore, in a method for producing a casting sand mold according to an ink jet type lamination shaping method, a method for producing a casting sand mold has been proposed in which kneaded sand of a region to which a binder is not printed in a lamination printing step (hereinafter, may be simply referred to as a "non-printing region") is collected in a collecting step, and is reused by being roasted in a recycling step (PTL 1). In addition, a method has also been proposed in which a binder is printed to laminated sand to be a laminated object, and then, the binder is cured by being aerated with a gas curing agent (PTL 2). However, in any methods, it was necessary that a sand mold before curing that was produced (hereinafter, may be referred to as a "sand mold before curing") was taken out from the lamination shaping apparatus and was move into a curing device, and the sand mold was damaged or collapsed even with a light impact, and thus, a cautious operation was required, and a decrease in productivity such as the complication of productive facility or an extension in a production time occurred, and therefore, there was room for improvement in handleability. In addition, in the case of increasing a resin content rate in the binder in order to increase the hardness of the sand mold before curing, clogging easily occurred in an ink jet nozzle head, and discharge properties were impaired.

CITATION LIST

Patent Literature

PTL 1: JP-A-2015-205337
PTL 2: JP-A-2015-193035

SUMMARY OF INVENTION

Technical Problem

Therefore, an object of the invention is to provide a binder that exhibits excellent discharge properties in an ink jet nozzle head in the producing of a casting sand mold according to an ink jet type lamination shaping method in which a binder is printed with respect to sand, and that is capable of providing a sand mold before curing which is excellent in handleability, a method for producing the binder, and a method for producing a casting sand mold using the binder.

Solution to Problem

As a result of intensive studies of the present inventors, it has been found that a binder has excellent discharge properties in an ink jet nozzle head and is capable of providing sand mold before curing having a high hardness and excellent handleability, by using a resol-type phenolic resin having a specific dispersion degree and a reduced unreacted phenolic monomer, as a binder, and thus, the object described has been attained.

That is, the invention relates to a binder useful for a casting sand mold according to an ink jet type lamination shaping method, the binder containing:
  a resol-type phenolic resin (R) having a ratio (Mw/Mn) of
    mass average molecular weight (Mw) to number average molecular weight (Mn) in a range of 1.0 or more
    and 3.5 or less, with the content of a phenolic monomer
    contained therein being in a range of 5% or less,
  in which the resol-type phenolic resin (R) is obtained by
    reacting aldehydes (A1), phenols (P1), and a compound
    (N) having two or more phenolic hydroxyl groups in
    one molecule in the presence of an alkali catalyst (B1)
    or by reacting the aldehydes (A1) and a novolac-type
    phenolic resin (N1) in the presence of the alkali catalyst
    (B1).

In addition, the invention relates to a method for producing a binder that is useful for a casting sand mold according to an ink jet type lamination shaping method and that contains a resol-type phenolic resin (R) having a ratio (Mw/Mn) of mass average molecular weight (Mw) to number average molecular weight (Mn) in a range of 1.0 or more and 3.5 or less, with the content of a phenolic monomer contained therein being in a range of 5% or less, the method including:
  a step of obtaining the resol-type phenolic resin (R) by
    reacting aldehydes (A1), phenols (P1), and a compound
    (N) having two or more phenolic hydroxyl groups in
    one molecule in the presence of an alkali catalyst (B1);
    or
  a step of obtaining the resol-type phenolic resin (R) by
    reacting the aldehydes (A1) and a novolac-type phenolic resin (N1) in the presence of the alkali catalyst
    (B1).

In addition, the invention relates to a method for producing a casting sand mold according to an ink jet type lamination shaping method in which a binder is printed, the method including:
  a step of printing the binder to the casting sand mold,
  in which the binder contains a resol-type phenolic resin
    (R) having a ratio (Mw/Mn) of mass average molecular
    weight (Mw) to number average molecular weight
    (Mn) in a range of 1.0 or more and 3.5 or less, with the
    content of a phenolic monomer contained therein being
    in a range of 5% or less, and the resol-type phenolic resin (R) is obtained by reacting aldehydes (A1), phenols (P1), and a compound (N) having two or more phenolic hydroxyl groups in one molecule in the presence of an alkali catalyst (B1) or by reacting the aldehydes (A1) and a novolac-type phenolic resin (N1) in the presence of the alkali catalyst (B1).

Advantageous Effects of Invention

According to the invention, it is possible to provide a binder capable of providing a casting sand mold before curing having a high hardness and excellent handleability, in the producing of a casting sand mold according to an ink jet type lamination shaping method in which a binder is printed with respect to sand, a method for producing the binder, and a method for producing a casting sand mold using the binder.

BRIEF DESCRIPTION OF DRAWINGS

FIG. 1-1 is a schematic view of a producing apparatus of a casting sand mold according to one embodiment of the invention, which is produced in Examples and Comparative Examples.

FIG. 1-2 is a schematic view of the casting sand mold according to one embodiment of the invention, which is produced in Examples and Comparative Examples.

FIG. 11 is a GPC chart relevant to a solution containing a resol-type phenolic resin, which is obtained in Comparative Synthesis Example 2.

FIG. 12 is a GPC chart relevant to a solution containing a resol-type phenolic resin, which is obtained in Comparative Synthesis Example 3.

DESCRIPTION OF EMBODIMENTS

A binder of the invention is a binder useful in producing a casting sand mold according to an ink jet type lamination shaping method in which a binder is printed, in which the binder contains a resol-type phenolic resin (R) having a ratio (Mw/Mn) of mass average molecular weight (Mw) to number average molecular weight (Mn) in a range of 1.0 or more and 3.5 or less, with the content of a phenolic monomer contained therein being in a range of 5% or less.

(Sand)

Examples of the sand to be used in the invention include natural sand that is a granular material having fire resistance, such as silica sand, olivine sand, zircon sand, chromite sand, alumina sand, and mullite sand, and artificial sand obtained by treating bauxite as a raw material with any method of a sintering method, a fusing method, a flame fusing method. In addition, sand obtained by collecting the used natural sand or artificial sand, sand obtained by performing a recycling treatment with respect to the used natural sand or artificial sand, or the like can be used.

A particle diameter of the sand is not particularly limited, but in order to obtain a three-dimensional lamination shaping casting mold having small surface roughness, an average particle diameter is preferably in a range of 50 to 300 μm, and is more preferably in a range of 75 to 150 μm.

Sand that is removed from a sand mold may be collected and reused. In the invention, it is not essential that the sand is kneaded with a curing agent to be used as kneaded sand, and thus, sand that is removed by a plate mechanism before printing can be reused without being subjected to a recycled sand treatment such as roasting. On the other hand, sand in a non-printing region after printing may contain the binder, and thus, is not reused, or in a case where the sand is reused, it is preferable that the sand is subjected to the recycled sand treatment such as roasting.

In addition, the same may be kneaded with various additives or a curing agent, as an arbitrary component, to be used as the kneaded sand. Examples of such various additives include an inorganic material such as calcium carbonate, calcium hydroxide, silicon oxide, magnesium oxide, calcium sulfate, barium sulfate, an aluminum powder, an iron powder, a copper powder, and a silver powder; and an organic material such as wheat flour, rice powder, wood powder, walnut kernel flour, apricot kernel flour, olive kernel flour, and carbon. Such additives are an arbitrary component. In addition, the curing agent causes gas generation at the time of heating and curing, and thus, it is preferable that the curing agent is not used, but in the case of using the curing agent, the curing agent is used preferably in a range of 1 part by mass or less, more preferably in a range of 0.2 parts by mass or more and 0.8 parts by mass or less, with respect to 100 parts by mass of the sand. Known curing agents may be used as the curing agent, within a range not impairing the effects of the invention, and examples thereof include a sulfuric acid, a phosphoric acid, a sulfonic acid such as a paratoluene sulfonic acid, a xylene sulfonic acid, a benzene sulfonic acid, and a methane sulfonic acid, and carboxylic acids such as a lactic acid, a citric acid, a malic acid, a tartaric acid, a malonic acid, a maleic acid, an oxalic acid, and a benzoic acid. One type of the curing agents may be used, or two or more types thereof may be used together.

(Binder)

The binder of the invention contains the resol-type phenolic resin (R) with the content of a phenolic monomer being in a range of 5% or less. Such a resol-type phenolic resin (R), for example, can be obtained by reacting aldehydes (A1), phenols (P1), and a compound (N) having two or more phenolic hydroxyl groups in one molecule in the presence of an alkali catalyst (B1).

Examples of the aldehydes (A1) include a compound having an aldehyde group in the molecules, such as formaldehyde, paraformaldehyde, trioxane, acetaldehyde, and urotropine. Among them, formaldehyde is preferable from the viewpoint of performance and economic efficiency. One type of the aldehydes (A) may be used, or two or more types thereof may be used together.

Examples of the phenols (P1) include phenol and a compound in which a hydrogen atom to be bonded to an aromatic ring is substituted with a hydroxyl group, for example, alkyl phenol such as cresol, xylenol, ethyl phenol, butyl phenol, and octyl phenol, polyhydric phenols such as resorcine and catechol, halogenated phenol, phenyl phenol, and aminophenol. Among them, phenol is preferable since a resol-type phenolic resin having excellent curing properties and water-solubility can be obtained and economic efficiency is also excellent. One type of the phenols may be used, or two or more types thereof may be used together.

(Compound Having Two or More Phenolic Hydroxyl Groups in One Molecule)

Examples of the compound (N) having two or more phenolic hydroxyl groups in one molecule include a novolac-type phenolic resin (N1) or a bisphenol (N2). The novolac-type phenolic resin (N1) is not particularly limited unless the effects of the invention are impaired, and known novolac-type phenolic resins can be used.

A method for producing a novolac-type phenolic resin is not particularly limited insofar as the method is a known method for reacting aldehydes (A2) and phenols (P2) in the presence of an acid catalyst (B2), and for example, the novolac-type phenolic resin can be produced through the following steps.

A ratio of the aldehydes (A2) to the phenols (P2) is preferably in a range of 0.3 to 1.0, and is more preferably in a range of 0.5 to 0.8, in terms of a molar ratio (A2/P2). Examples of the aldehydes (A2) and the phenols (P2) include the same examples as those of the aldehydes (A1) and the phenols (P1), respectively. In addition, an acid that is generally used in producing a novolac resin can be used as the acid catalyst (B2), and examples thereof include an oxalic acid, a hydrochloric acid, a phosphoric acid, a sulfuric acid, a paratoluene sulfonic acid, a phenol sulfonic acid, and zinc acetate or zinc octylate that is a catalyst of a high ortho-novolac resin.

In a reaction condition at the time of producing the novolac-type phenolic resin, a reaction may be performed in a range of 60 to 100° C. for 1 to 5 hours. After that, the phenolic monomer remaining in the novolac resin is removed at a temperature of 180 to 230° C. through an atmospheric-pressure dewatering step and a reduced-pressure dewatering step. In such it is preferable that a removing operation, the content of the phenolic monomer remaining in the novolac resin is minimized, and practically, it is preferable that the content is in a range of 1.0% by mass or less, and it is particularly preferable that the content is reduced to a range of 0.01% by mass or less.

A compound in which one molecule of aldehyde or ketone and two molecules of phenols such as phenol are condensed, such as bisphenol A and bisphenol F, can be used as the bisphenol (N2).

An alkali catalyst that is generally used at the time of producing the resol-type phenolic resin may be used as the alkali catalyst (B1), and examples thereof include a hydroxide of an alkali metal, a hydroxide of an alkali earth metal, primary amine, secondary amine, and tertiary amine. Examples of the hydroxide of the alkali metal include lithium hydroxide, sodium hydroxide, and potassium hydroxide. Examples of the hydroxide of the alkali earth metal include magnesium hydroxide, calcium hydroxide, and barium hydroxide. Examples of the primary amine include ammonia and monoethanol amine. Examples of the secondary amine include diethanol amine. Examples of the tertiary amine include trimethyl amine, triethyl amine, triethanol amine, and diazabicycloundecene. Note that, one type of the alkali catalysts may be used, or two or more types thereof may be used together.

A used amount of the aldehydes (A1) and the phenols (P1) is in a range of preferably 1.4 or more, more preferably 1.6 or more and preferably 2.8 or less, more preferably 2.6 or less, in terms of a molar ratio (A/P), from the viewpoint of reducing the amount of remaining phenolic monomer and of excellent heat resistance after curing and excellent mechanical strength.

A used amount of the compound (N) is not particularly limited unless the effects of the invention are impaired, and is in a range of preferably 0.05 or more, more preferably 0.1 or more, even more preferably 0.2 or more and preferably 1.0 or less, more preferably 0.5 or less, with respect to the phenols (P1), in terms of a molar ratio (N/P1).

In a step of reacting at least the aldehydes (A1) and the phenols (P1) in the presence of the alkali catalyst (B1), a reaction temperature may be suitably adjusted generally in a range of 50 to 90° C. A timing for adding the compound (N) having two or more phenolic hydroxyl groups in one molecule is not particularly limited, and the compound (N) having two or more phenolic hydroxyl groups in one molecule may be added along with the aldehydes (A1) and the phenols (P1) (Method 1) or the compound (N) having two or more phenolic hydroxyl groups in one molecule can also be added after the reaction between the aldehydes (A1) and the phenols (P1) (Method 2). In (Method 2), a timing for adding the compound (N) is not particularly limited, but it is preferable that 1 to 4 hours elapse after the reaction between the aldehydes (A1) and the phenols (P1).

In (Method 1), a used amount of the alkali catalyst (B1) is in a range of 0.01 or more, preferably 0.05 or more and less than 0.4, preferably 0.35 or less, more preferably 0.2 or less, in terms of a molar ratio (B1/P1), from the viewpoint of reducing the amount of remaining phenolic monomer and of excellent heat resistance after curing and excellent mechanical strength. In contrast, in (Method 2), the used amount is not particularly limited unless the effects of the invention are impaired, but is in a range of 0.01 or more, more preferably 0.05 or more and less than 0.4, more preferably 0.35 or less, even more preferably 0.2 or less, from the viewpoint of reducing the amount of remaining phenolic monomer and of excellent heat resistance after curing and excellent mechanical strength.

In addition, the resol-type phenolic resin (R) used in the invention may be produced by reacting the aldehydes (A1) and the novolac-type phenolic resin (N1) in the presence of the alkali catalyst (B1). Note that, a reaction temperature may be suitably adjusted generally in a range of 50 to 90° C. In addition, the used amount of the alkali catalyst (B1) is the same as that in (Method 1).

In the resol-type phenolic resin (R) obtained as described above, a ratio (Mw/Mn) of mass average molecular weight (Mw) to number average molecular weight (Mn) (hereinafter, may be referred to as a dispersion degree) is in a range of 3.5 or less, preferably 2.5 or less, more preferably 2.0 or less, even more preferably 1.8 or less to 1.0 or more, preferably 1.1 or more, more preferably 1.2 or more, even more preferably 1.3 or more, from the viewpoint of a high hardness and excellent handleability of a sand mold before curing, and excellent discharge properties from an ink jet nozzle. The dispersion degree to be obtained is different in accordance with the object, the application, or the like, and thus, it is not possible to uniformly define the number average molecular weight and the mass average molecular weight of the resol-type phenolic resin (R), but the number average molecular weight (Mn) is in a range of preferably 150 or more, more preferably 200 or more, even more preferably 300 or more and preferably 1000 or less, more preferably 800 or less, even more preferably 700 or less, particularly preferably 600 or less.

Note that, in the invention, the number average molecular weight and the mass average molecular weight were measured by a gel permeation chromatography (GPC), in the following conditions.

Measurement Device: HLC-8220GPC, Manufactured by TOSOH CORPORATION

Column: G2000HXLx2, G3000HXL, and G4000HXL of 7.8 mm$\phi$×300 mm, Manufactured by TOSOH CORPORATION Detector: RI (Differential Refractometer)

| | |
|---|---|
| Column Temperature | 40° C. |
| Solvent | THF |
| Flow Rate | 1.0 ml/min |

Measurement Condition:

Standard: Prepare Standard Curve in Polystyrene Standard Specimen

Specimen: Solution Obtained by Weighing 20 mg of Sample, by Increasing Mass of Sample to 10 ml in THF, and by Filtering Sample with Microfilter (Injected Amount: 200 μl)

In the resol-type phenolic resin (R) obtained as described above, the ratio of the phenolic monomer in the resin is in a range of 5% by mass or less, preferably 3% by mass or less, more preferably 1% by mass or less. It is preferable that the phenolic monomer is small, and a lower limit value (a measurable limit value) is not set, but in general, the ratio is in a range of 0.001% by mass or more, more preferably 0.01% by mass or more. In the range described above, the sand mold before curing using the binder of the invention has a high hardness and excellent handleability. Note that, the "phenolic monomer" indicates the compound in which a hydrogen atom to be bonded to an aromatic ring is substituted with a hydroxyl group, and is mainly derived from the phenols (P1) or the phenols (P2) existing as an unreacted monomer.

Further, in the resol-type phenolic resin (R) used in the invention, viscosity at 25° C. that measured by a B-type viscometer (JISZ8803) is preferably in a range of 2 to 30 mPa·S, and is more preferably in a range of 4 to 20 mPa·S, from the viewpoint of excellent discharge properties from the ink jet nozzle.

The binder of the invention contains the resol-type phenolic resin (R) of the invention as an essential component, and it is preferable that the binder, for example, contains an organic solvent, various additives, and the like, in accordance with a using method or the application, after water is suitably removed from the resol-type phenolic resin (R) obtained in the step described above.

Various organic solvents can be used as the organic solvent insofar as the organic solvent is capable of dissolving the resol-type phenolic resin (R), and examples thereof include alcohols such as methanol, ethanol, n-propanol, and isopropanol; ketones such as acetone and methyl ethyl ketone; glycols such as ethylene glycol, propylene glycol, and hexylene glycol; ethers such as dimethoxyethane, tetrahydrofuran, dioxane, ethylene glycol dimethyl ether, ethylene glycol dibutyl ether, diethylene glycol dimethyl ether, and diethylene glycol dibutyl ether; and acetates such as butyl carbitol acetate and propylene glycol monomethyl acetate. Note that, one type of the organic solvents may be used, or two or more types thereof may be used together.

Among them, it is preferable that the content of the resol-type phenolic resin (R) in the binder is 5 to 200 parts by mass with respect to 100 parts by mass of the organic solvent.

In addition, examples of the various additives include a coupling agent. Examples of the coupling agent include a silane coupling agent such as N-β(aminoethyl)γ-aminopropyl methyl dimethoxysilane, γ-aminopropyl triethoxysilane, γ-(2-aminoethyl) aminopropyl trimethoxysilane, and γ-glycidoxypropyl trimethoxysilane.

(Lamination Shaping Method)

A method for producing a casting sand mold of the invention is a method for producing a casting sand mold according to an ink jet type lamination shaping method in which a binder is printed, in which the binder contains at least a resol-type phenolic resin (R) that is obtained through a step of reacting aldehydes (A1) and phenols (P1) in the presence of an alkali catalyst (B1), and then, a step of performing a reaction by adding a compound (N) having two or more phenolic hydroxyl groups in one molecule, with the content of a phenolic monomer contained therein being in a range of 5% or less.

It is preferable that a device including a blade mechanism, a printing nozzle head (an ink jet nozzle head), a support table mechanism, and a control mechanism and a driving mechanism of the operation of each of the mechanisms (hereinafter, may be simply referred to as a "lamination shaping device") is mainly used in the lamination shaping method used in the invention. Examples of such a device include an ink jet type three-dimensional lamination shaping apparatus (for example, Ex One S-MAX (Trademark), Distribution Source: ExOne Company).

The lamination shaping method used in the invention is a method for shaping a casting sand mold by printing the binder of the invention while laminating the sand one layer by one layer.

The printing of each layer is performed by a method including a step of homogeneously spreading a layer of sand having a predetermined thickness onto a flat surface with blade mechanism such as a roller or a recoater, and a step of scanning the printing nozzle head (the ink jet nozzle head) with respect to a predetermined region in the layer, on the basis of data obtained by designing the shape of the sand mold in 3DCAD and of discharging the binder from the printing nozzle head to be attached to the sand. A coating amount at the time of printing the binder is not particularly limited, and when the sand is set to 100 parts by mass, a coating amount in a printing region for one layer is in a range of preferably 0.4 parts by mass or more, more preferably 0.8 parts by mass or more and preferably 10 parts by mass or less, more preferably 5 parts by mass or less. The thickness of each layer is not particularly limited within a range not impairing the effects of the invention, and is in a range of preferably 10 μm or more, more preferably 100 μm or more, even more preferably 200 mm or more and preferably 10 mm or less, more preferably 1 mm or less, even more preferably 500 μm or less.

The method includes a step of moving the support table mechanism to a height by the distance of one layer in a case where the shaping of one layer is completed, and after that, as necessary, the printing of the next layer can be performed. The layer of the binder in the printing region is in a junction state, and in a case where there is a lower layer that is formed in advance, the layer is also bonded to the lower layer. Then, a step of printing the binder by sequentially forming the layer on the upper portion until the entire sand mold is completed is repeated. It is preferable that a plurality of sand molds, a plurality of types of sand molds are laid out and the maximum number of sand molds are collectively subjected to lamination shaping when the lamination shaping apparatus is activated.

The sand mold obtained as described above may include a step of drying a solvent contained in the binder within a range in which the resol-type phenolic resin (R) in the binder contained in the sand mold is not cured (hereinafter, simply referred to as a "drying step"), before the sand in the non-printing region of the binder is removed. The drying step may be performed for each single layer, or may be performed after laminating two or more layers, and it is preferable that the drying step is performed after the entire sand mold is completed, from the viewpoint of interlayer bonding strength or productivity. The drying step is not particularly limited insofar as the solvent in the binder is removed and the temperature is in a range in which the binder is not cured, and is in a range of preferably 1° C. or higher, more preferably a room temperature (23° C.) or higher and preferably 100° C. or lower, more preferably 60° C. or lower. A method for placing the sand mold under the aeration or spray of the air or inert gas in the temperature range described above and/or under the reduced-pressure or for performing the drying step by spraying the air or the inert gas is exemplified.

The binder of the invention is capable of retaining a high hardness of the sand mold in the printing region even before being cured, and thus, the occurrence of the collapse or the damage of the region can be suppressed, and excellent handleability is obtained.

Subsequently, the sand mold through the drying step as described above includes a step of curing the resol-type phenolic resin (R) in the binder (hereinafter, simply referred to as a "curing step"). Examples of the curing step include a method for heating and curing the sand mold with a heating treatment such as microwave heating or infrared ray heating.

Further, the sand mold through the curing step includes a step of removing the sand in the non-printing region of the binder from the sand mold (hereinafter, may be simply referred to as a "removing step"). In the removing step, the sand can be removed by using the air or a brush. The sand in the non-printing region of the binder is in a non-bonding state, and thus, can be easily removed from the sand mold.

The sand mold obtained as described above can be independently used or a plurality of sand molds can be used by being combined and subjected to mold matching, as a casting mold, and a cast can be produced by inpouring a fusing metal, by performing mold shaking, and then, as necessary, by performing a finishing treatment.

EXAMPLES

Next, the invention will be described in more detail by Examples and Comparative Examples, but the invention is not limited thereto. In addition, hereinafter, "parts" and "%" are on a mass basis, unless otherwise noted.

(Synthesis Example 1) Synthesis of Novolac Resin 941 parts by mass of phenol and 360 parts by mass of formalin of 50% by mass were put in a flask to which a thermometer, a dropping funnel, a cooling tube, a fractionating tube, and a stirrer were attached, stirring was started, and then, 1.88 parts by mass of an oxalic acid was added, and the temperature was raised to 100° C. A reaction was performed at 100° C. for 3 hours, and then, dewatering was performed at the atmospheric-pressure until the temperature reached 150° C. Next, phenol removal was performed at −0.094 MPa for 2 hours. After that, 100 parts by mass of methanol was gradually dropped while being careful of bumping, and thus, a novolac-type phenolic resin (1) having a solid content of 90% by mass and viscosity of 90000 mPa·s/25° C. was obtained.

(Synthesis Example 2) Manufacturing of Binder 94 parts by mass of phenol, 108.7 parts by mass of formalin (50.2%), and 4.3 parts by mass of sodium hydroxide of 48% were put in a flask to which a thermometer, a dropping funnel, a cooling tube, a fractionating tube, and a stirrer were attached, and a reaction was performed at 75° C. for 3 hours. Next, 52.3 parts by mass of the novolac resin methanol solution of Synthesis Example 1 was put, and a reaction was further performed at 75° C. for 2 hours. After the reaction was completed, methanol was added, and a solution (1) containing a resol-type phenolic resin having a resin solid content of 38% was obtained. Mass average molecular weight (Mw) of the resin solid content was 538, number average molecular weight (Mn) of the resin solid content was 339, a dispersion degree (Mw/Mn) was 1.587, and the content of a phenolic monomer was 2% with respect to the solid content in the solution (1).

(Synthesis Example 3) Manufacturing of Binder 94 parts by mass of phenol, 129.0 parts by mass of formalin (50.2%), and 5.6 parts by mass of sodium hydroxide of 48% were put in a flask to which a thermometer, a dropping funnel, a cooling tube, a fractionating tube, and a stirrer were attached, and a reaction was performed at 75° C. for 3 hours. Next, 104.6 parts by mass of the novolac resin methanol solution of Synthesis Example 1 was put, and a reaction was further performed at 75° C. for 2 hours. After the reaction was completed, IPA was added, and thus, a solution (2) containing a resol-type phenolic resin having a resin solid content of 30% was obtained. Mass average molecular weight (Mw) of the resin solid content was 723, number average molecular weight (Mn) of the resin solid content was 426, a dispersion degree (Mw/Mn) was 1.697, and the content of a phenolic monomer was 0.7% with respect to the solid content in the solution (2).

(Synthesis Example 4) Manufacturing of Binder 156 parts by mass of the novolac resin methanol solution of Synthesis Example 1, 63.0 parts by mass of formalin (50.2%), and 4.2 parts by mass of sodium hydroxide of 48% were put in a flask to which a thermometer, a dropping funnel, a cooling tube, a fractionating tube, and a stirrer were attached, and a reaction was performed at 75° C. for 2 hours. After the reaction was completed, methanol was added, and thus, a solution (4) containing a resol-type phenolic resin having a resin solid content of 38% was obtained. Mass average molecular weight (Mw) of the resin solid content was 1174, number average molecular weight (Mn) of the resin solid content was 575, a dispersion degree (Mw/Mn) was 2.042, and the content of a phenolic monomer was not detected.

(Synthesis Example 5) Manufacturing of Binder

A solution (5) containing a resol-type phenolic resin having a resin solid content of 38% was obtained by the same operation as that in Synthesis Example 3, except that "adding IPA after the reaction was completed" was changed to "adding methanol after the reaction was completed". Mass average molecular weight (Mw) of the resin solid content was 848, number average molecular weight (Mn) of the resin solid content was 455, a dispersion degree (Mw/Mn) was 1.865, and the content of a phenolic monomer was 1% with respect to the solid content in the solution (5).

(Synthesis Example 6) Manufacturing of Binder

A solution (6) containing a resol-type phenolic resin having a resin solid content of 30% was obtained by the same operation as that in Synthesis Example 2, except that "adding IPA after the reaction was completed" was changed to "adding ethanol after the reaction was completed". Mass average molecular weight (Mw) of the resin solid content was 773, number average molecular weight (Mn) of the resin solid content was 431, a dispersion degree (Mw/Mn) was 1.792, and the content of a phenolic monomer was 0.8% with respect to the solid content in the solution (6).

(Synthesis Example 7) Manufacturing of Binder

A solution (7) containing a resol-type phenolic resin having a resin solid content of 30% was obtained by the same operation as that in Synthesis Example 2, except that "adding IPA after the reaction was completed" was changed to "adding a mixed solvent of Water/Methoxy Propanol=1/1". Mass average molecular weight (Mw) of the resin solid content was 629, number average molecular weight (Mn) of the resin solid content was 386, a dispersion degree (Mw/Mn) was 1.631, and the content of a phenolic monomer was 0.8% with respect to the solid content in the solution (7).

(Synthesis Example 8) Manufacturing of Binder 94 parts by mass of phenol, 114.1 parts by mass of formalin (50.20), and 5.6 parts by mass of sodium hydroxide of 48% were put in a flask to which a thermometer, a dropping funnel, a cooling tube, a fractionating tube, and a stirrer were attached, and a reaction was performed at 75° C. for 3 hours. Next, 94.1 parts by mass of bisphenol A and 10.5 parts by mass of methanol were put, and a reaction was further performed at 75° C. for 2 hours. After the reaction was completed, methanol was added, and thus, a solution (8) containing a resol-type phenolic resin having a resin solid content of 38% was obtained. Mass average molecular weight (Mw) of the resin solid content was 470, number average molecular weight (Mn) of the resin solid content was 356, a dispersion degree (Mw/Mn) was 1.320, and the content of a phenolic monomer was 1% with respect to the solid content in the solution (8).

(Synthesis Example 9) Manufacturing of Binder 94 parts by mass of phenol, 97.0 parts by mass of formalin (50.2%), and 5.6 parts by mass of sodium hydroxide of 48% were put in a flask to which a thermometer, a dropping funnel, a cooling tube, a fractionating tube, and a stirrer were attached, and a reaction was performed at 75° C. for 3 hours. Next, 94.1 parts by mass of bisphenol F and 10.5 parts by mass of methanol were put, and a reaction was further performed at 75° C. for 2 hours. After the reaction was completed, methanol was added, and thus, a solution (9) containing a resol-type phenolic resin having a resin solid content of 38% was obtained. Mass average molecular weight (Mw) of the resin solid content was 467, number average molecular weight (Mn) of the resin solid content was 341, a dispersion degree (Mw/Mn) was 1.373, and the content of a phenolic monomer was 1% with respect to the solid content in the solution (9).

(Comparative Synthesis Example 1) Manufacturing of Binder 94 parts by mass of phenol, 89.7 parts by mass of formalin (50.2%), and 1.4 parts by mass of sodium hydroxide of 48% were put in a flask to which a thermometer, a dropping funnel, a cooling tube, a fractionating tube, and a stirrer were attached, and a reaction was performed at 75° C. for 8 hours. Next, neutralization was performed with a p-toluene sulfonic acid, pH was adjusted to 5.1, and then, a solution (c1) containing a resol-type phenolic resin having a resin solid content of 38% was obtained. Mass average molecular weight (Mw) of the resin solid content was 376, number average molecular weight (Mn) of the resin solid content was 240, a dispersion degree (Mw/Mn) was 1.564, and the content of a phenolic monomer was 4.5% with respect to the solid content in the solution (c1).

(Comparative Synthesis Example 2) Manufacturing of Binder 94 parts by mass of phenol, 71.8 parts by mass of formalin (50.2%), and 1.4 parts by mass of sodium hydroxide of 48% were put in a flask to which a thermometer, a dropping funnel, a cooling tube, a fractionating tube, and a stirrer were attached, and a reaction was performed at 75° C. for 8 hours. Next, neutralization was performed with a p-toluene sulfonic acid, pH was adjusted to 5.1, and then, a solution (c2) containing a resol-type phenolic resin having a resin solid content of 38% was obtained. Mass average molecular weight (Mw) of the resin solid content was 288, number average molecular weight (Mn) of the resin solid content was 194, a dispersion degree (Mw/Mn) was 1.486, and the content of a phenolic monomer was 9% with respect to the solid content in the solution (c2).

(Comparative Synthesis Example 3) Manufacturing of Binder 94 g of phenol, 114.1 g of formalin (50.2%), 94.1 g of bisphenol A, 10.5 g of methanol, and 5.6 g of sodium hydroxide of 48% were put in a flask to which a thermometer, a dropping funnel, a cooling tube, a fractionating tube, and a stirrer were attached, and a reaction was performed at 75° C. for 5 hours. After the reaction was completed, methanol was added, and thus, a solution (c3) containing a resol-type phenolic resin having a resin solid content of 38% was obtained. Mass average molecular weight (Mw) of the resin solid content was 416, number average molecular weight (Mn) of the resin solid content was 237, a dispersion degree (Mw/Mn) was 1.753, and the content of a phenolic monomer was 5.5% with respect to the solid content in the solution (c3).

(Comparative Synthesis Example 4) Manufacturing of Binder 94 parts by mass of phenol, 108.7 parts by mass of formalin (50.2%), 52.3 parts by mass of the novolac resin methanol solution of Synthesis Example 1, and 4.3 parts by mass of sodium hydroxide of 48% were put in a flask to which a thermometer, a dropping funnel, a cooling tube, a fractionating tube, and a stirrer were attached, and a reaction was performed at 75° C. for 5 hours. After the reaction was completed, methanol was added, and thus, a solution (c4) containing a resol-type phenolic resin having a resin solid content of 38% was obtained. Mass average molecular weight (Mw) of the resin solid content was 1183, number average molecular weight (Mn) of the resin solid content was 282, a dispersion degree (Mw/Mn) was 4.196, and the content of a phenolic monomer was 4.9% with respect to the solid content in the solution (c4).

(Measurement Method: Measurement of Amount of Unreacted Phenolic Monomer)

Measurement was performed in the following device and measurement conditions by using GPC (a polystyrene standard method). First, in order to prepare a standard curve, GPC of a sample obtained by weighing 0.1 mg, 0.2 mg, 0.3 mg, 0.5 mg, 1 mg, 1.5 mg, and 2 mg of the phenolic monomer, and by increasing the mass of each phenolic monomer to 10 ml in THF was measured in a device having the following configuration. Next, 20 mg of the resins of Comparative Examples and Synthesis Examples was weighed, and the mass thereof was increased to 10 ml in THF. In the device having the following configuration, GPC was measured, and the amount of unreacted phenol in the solution was calculated from the height of a peak corresponding to the phenolic monomer and the standard curve.

Figure 2:
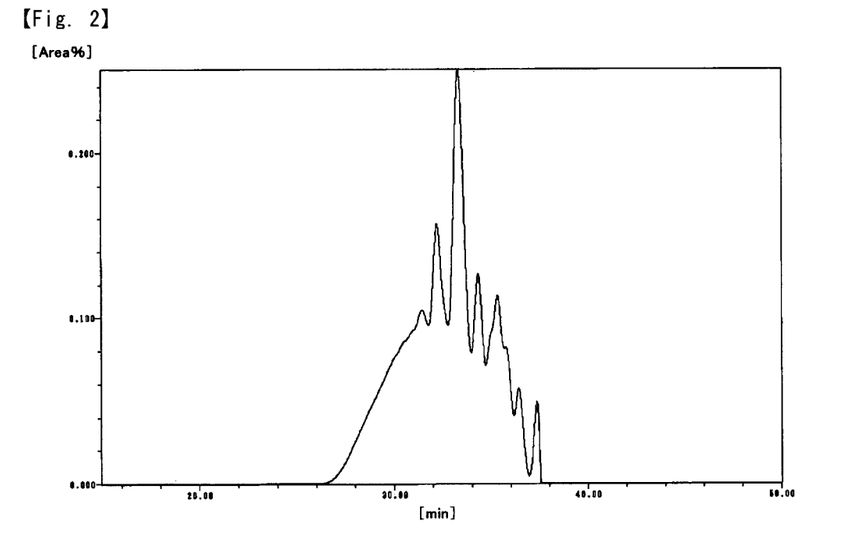
FIG. 2 is a GPC chart relevant to a solution containing a resol-type phenolic resin, which is obtained in Synthesis Example 2.
Figure 3:
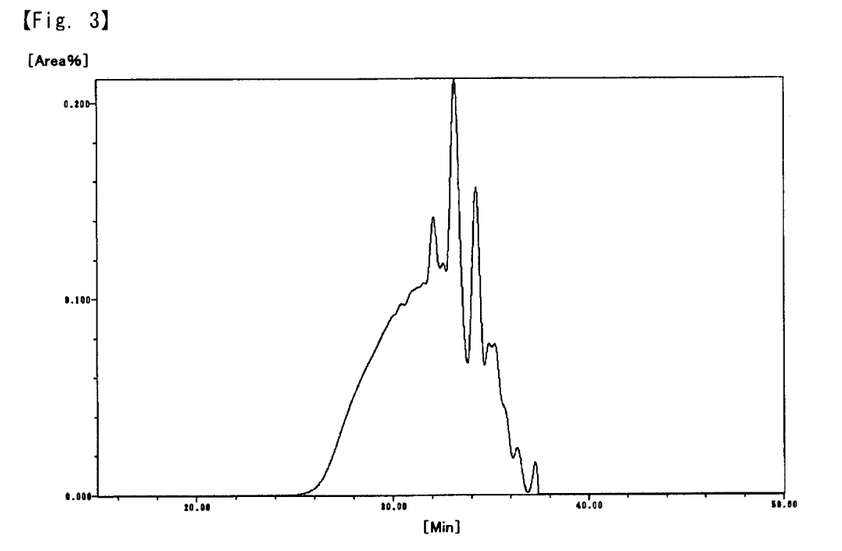
FIG. 3 is a GPC chart relevant to a solution containing a resol-type phenolic resin, which is obtained in Synthesis Example 3.
Figure 4:
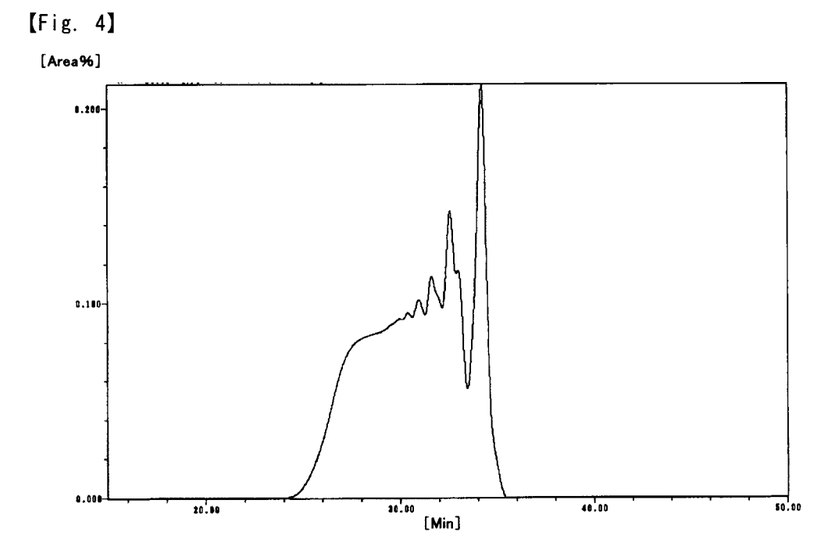
FIG. 4 is a GPC chart relevant to a solution containing a resol-type phenolic resin, which is obtained in Synthesis Example 4.
Figure 5:
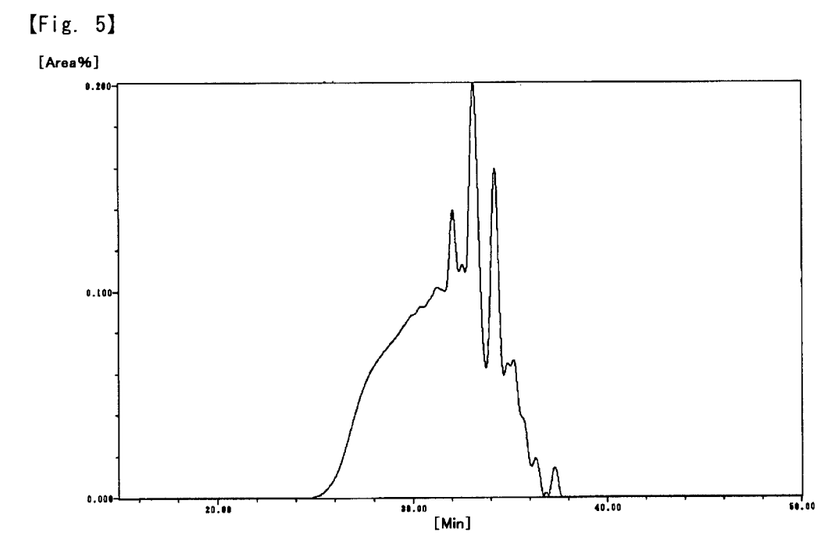
FIG. 5 is a GPC chart relevant to a solution containing a resol-type phenolic resin, which is obtained in Synthesis Example 5.
Figure 6:
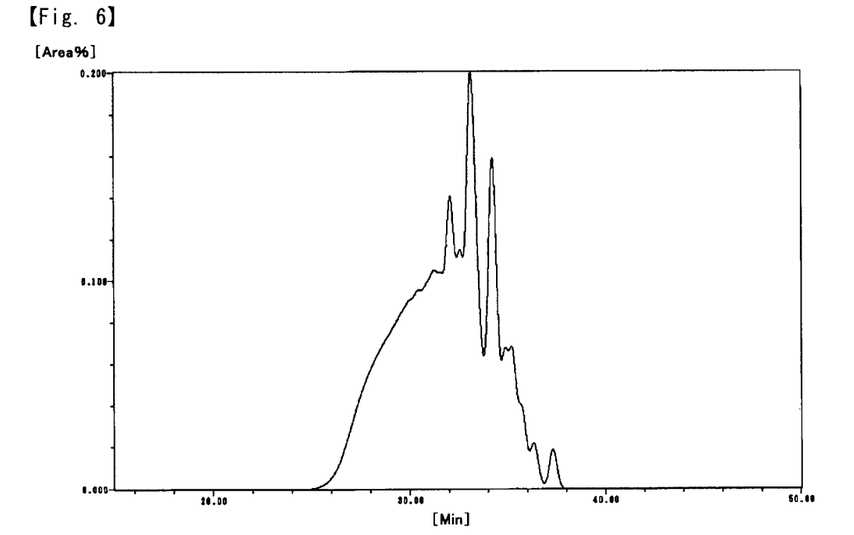
FIG. 6 is a GPC chart relevant to a solution containing a resol-type phenolic resin, which is obtained in Synthesis Example 6.
Figure 7:
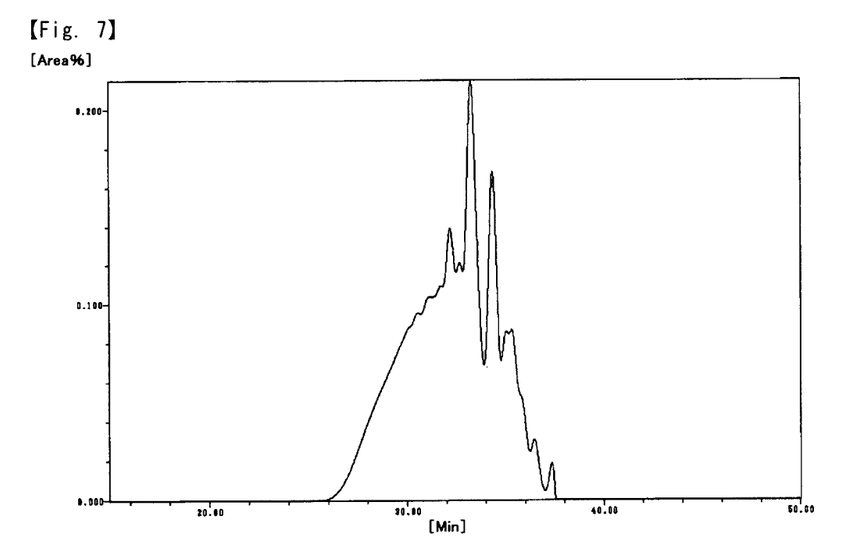
FIG. 7 is a GPC chart relevant to a solution containing a resol-type phenolic resin, which is obtained in Synthesis Example 7.
Figure 8:
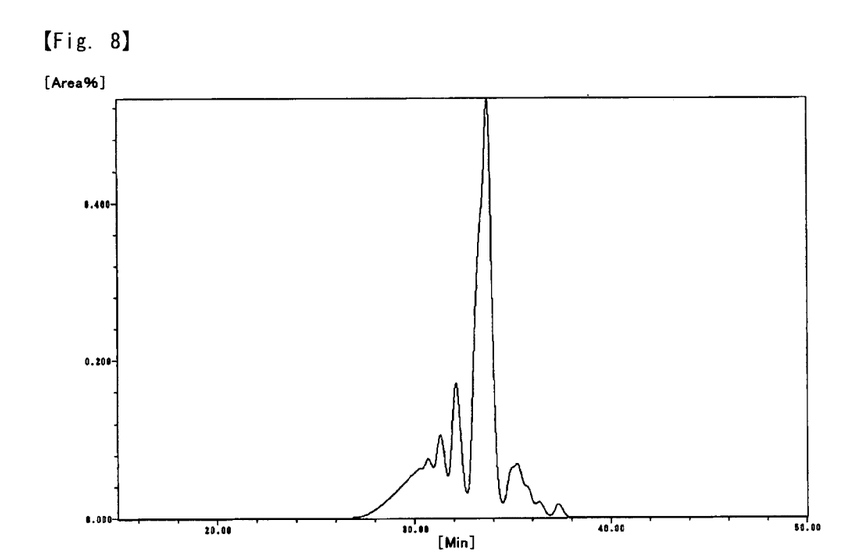
FIG. 8 is a GPC chart relevant to a solution containing a resol-type phenolic resin, which is obtained in Synthesis Example 8.
Figure 9:
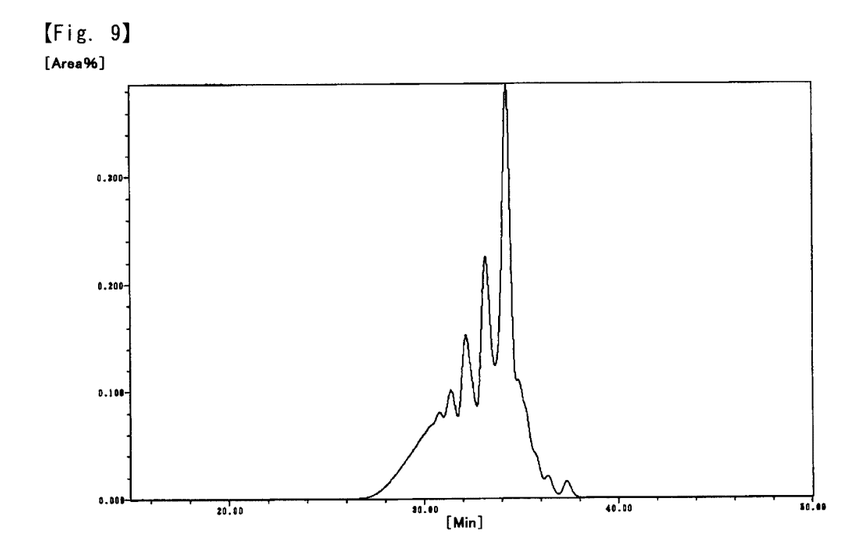
FIG. 9 is a GPC chart relevant to a solution containing a resol-type phenolic resin, which is obtained in Synthesis Example 9.
Figure 10:
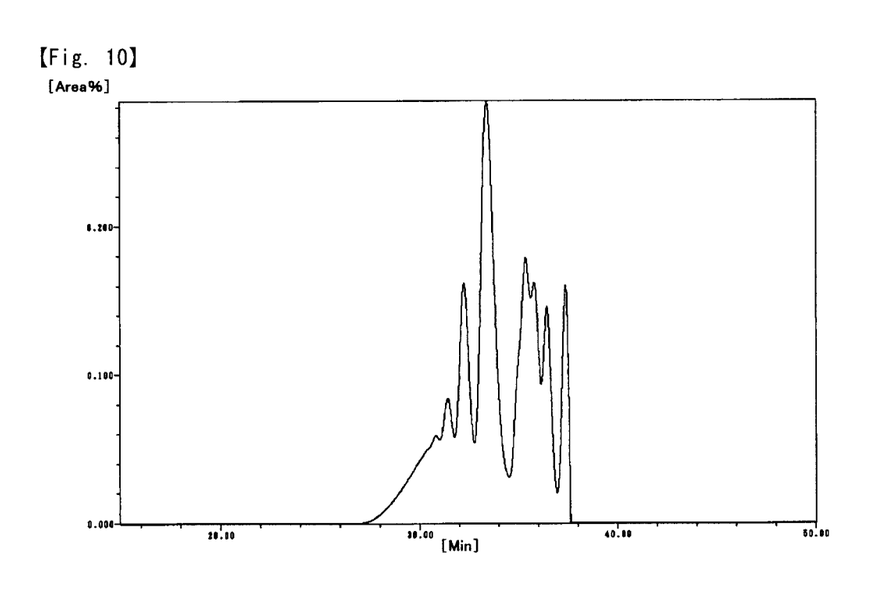
FIG. 10 is a GPC chart relevant to a solution containing a resol-type phenolic resin, which is obtained in Comparative Synthesis Example 1.
Figure 11:
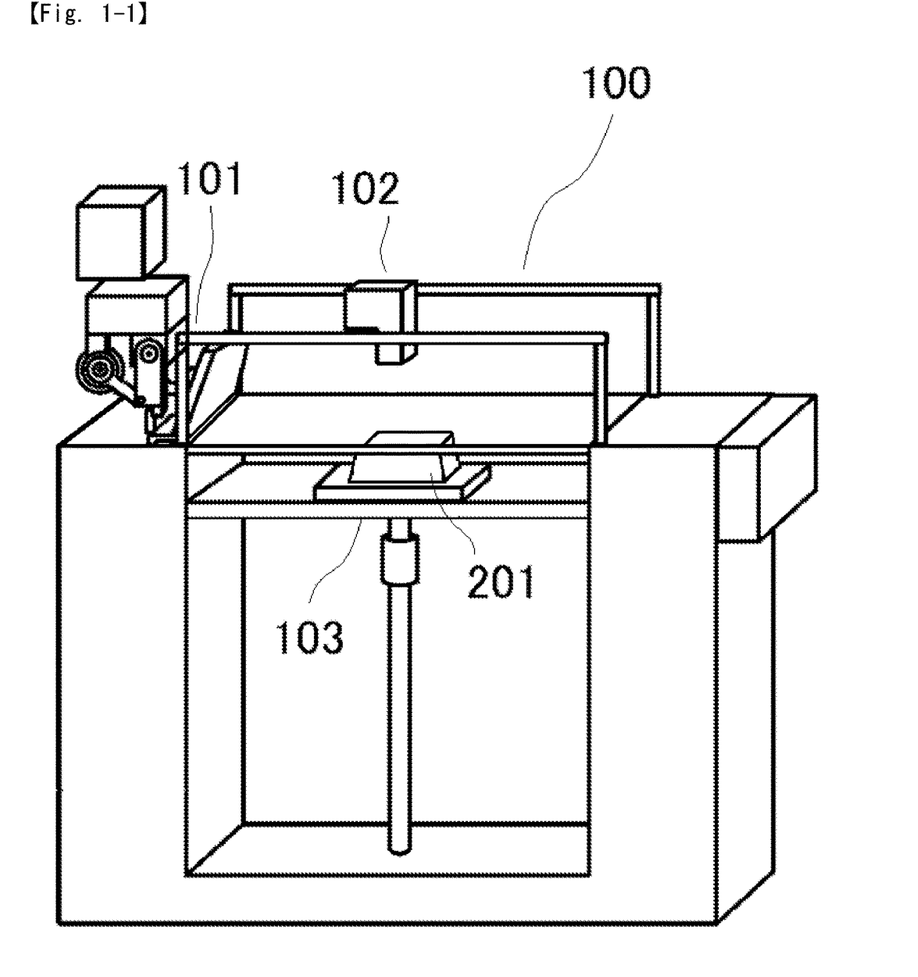

Device: "HLC-8220GPC", Manufactured by TOSOH CORPORATION
Column: G2000HXLx2, G3000HXL, and G4000HXL of 7.8 mmϕ×300 mm
Column Temperature: 40° C.
Detector: RI
Carrier Solvent: Tetrahydrofuran
Flow Rate: 1.0 ml/minute Examples 1 to 10 and Comparative Examples 1 to 3 Evaluation of Hardness of Sand Mold Before Curing A three-dimensional laminating apparatus (100) using a printing shaping method, illustrated in FIG. 1-1, was used, and sand (Thera Beads) was laminated on the bottom surface of a metal case provided in the three-dimensional laminating apparatus by a blade mechanism (101) including a recoater.

Figure 12:
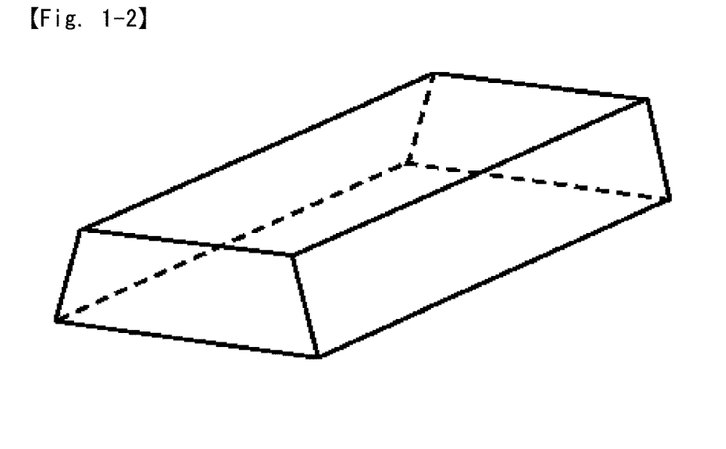
Figure 13:
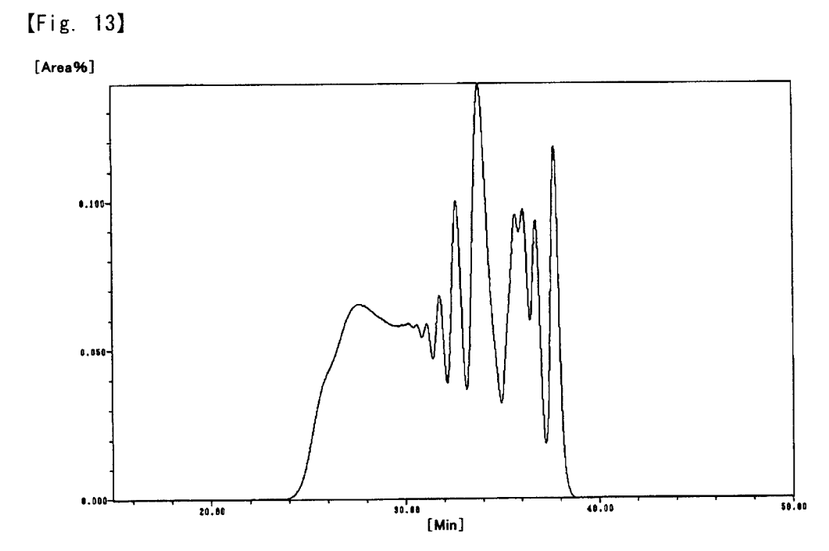
FIG. 13 is a GPC chart relevant to a solution containing a resol-type phenolic resin, which is obtained in Comparative Synthesis Example 4.

Subsequently, the binders (1) to (10) and (c1) to (c3) produced in Synthesis Examples 1 to 11 and Comparative Synthesis Examples 1 to 3 were printed by scanning a printing nozzle head (102) on a fire-resistant granular material that was laminated, on the basis of data obtained by designing the shape of a three-dimensional lamination shaping casting mold in 3DCAD, such that a discharge amount of the binder with respect to the sand in a printing region of the binder was 2.3 parts by mass with respect to 100 parts by mass of the laminated sand. After that, the bottom surface of the metal case (a shaping table (103)) was lowered by one layer (280 μm), the sand was laminated as described above, and the binder was printed thereon as described above. A step including the lamination and the printing was repeated, and finally, preparation was performed such that a sand mold (201) having an upper surface of 30 mm, a lower surface of 36 mm, a length of 76 mm, and a height of 15 mm, as illustrated in FIG. 1-2, was obtained.

As a drying step, the sand mold was exposed to an atmospheric temperature for a time shown in Tables 1 to 3, and then, was taken out from the metal case, and the hardness of a mold before curing was measured. Measurement values are shown in Tables 1 to 3.

Subsequently, the sand in a non-printing portion of the binder was removed with a brush, and the sand mold was taken out. After that, the sand mold was moved into a heating furnace, and was subjected to microwave heating such that the resin content was cured, and thus, the sand mold was produced.

Measurement Method: Evaluation of Hardness of Sand Mold before Curing

The body portion of the sand mold before curing was vertically pressed with a push/pull tester "MP-100", manufactured by ATTONIC ltd., to which an attachment "S-4" was attached, and a force necessary for breaking the sand mold was measured. The measurement was performed 10 times, and evaluation was performed by using the average value.

(Measurement Method: Evaluation of Ink Jet Discharge Properties)

When the sand mold was produced by using the three-dimensional laminating apparatus described above, a discharge state at the time of continuously discharging a liquid droplet from the printing nozzle head was observed.

A: In the observation of the continuous discharge for 1 hour, clogging did not occur in all nozzles.

B: In the observation of the continuous discharge for 1 hour, clogging occurred in 1 to 3 nozzles after the discharge, but was immediately recovered by the suction of the ink.

C: In the observation of the continuous discharge for 1 hour, clogging occurred in 4 to 10 nozzles after the discharge, but was immediately recovered by the suction of the ink.

D: In the observation of the continuous discharge for 1 hour, clogging occurred in 11 or more nozzles after the discharge.

E: In the observation of the continuous discharge for 1 hour, one or more nozzles that were not recovered by the suction of the ink occurred after the discharge.

TABLE 1

|  | Example 1 | Example 2 | Example 3 | Example 4 | Example 5 |
|---|---|---|---|---|---|
| Solution (No) | 1 | 2 | 3 | 4 | 5 |
| Drying temperature (° C.) | 23 | 23 | 23 | 23 | 50 |
| Drying time (hours) | 2 | 2 | 2 | 2 | 24 |
| Compression hardness of sand mold after drying (N) | 79 | 94 | >100 | 93 | 80 |
| Discharge properties | A | A | A | A | A |

TABLE 2

|  | Example 6 | Example 7 | Example 8 | Example 9 |
|---|---|---|---|---|
| Solution (No) | 6 | 7 | 8 | 9 |
| Drying temperature (° C.) | 23 | 23 | 23 | 23 |
| Drying time (hours) | 2 | 2 | 2 | 23 |
| Compression hardness of sand mold after drying (N) | >100 | 95 | >100 | 96 |
| Discharge properties | A | A | A | A |

TABLE 3

|  | Comparative Example 1 | Comparative Example 2 | Comparative Example 3 | Comparative Example 4 |
|---|---|---|---|---|
| Solution (No) | c1 | c2 | c3 | c4 |
| Drying temperature (° C.) | 23 | 23 | 23 | 23 |
| Drying time (hours) | 24 | 24 | 2 | 2 |
| Compression hardness of sand mold after drying (N) | 5 | 5 | 40 | 65 |
| Discharge properties | A | A | A | D |

REFERENCE SIGNS LIST

100: Three-dimensional laminating apparatus
101: Blade mechanism
102: Printing nozzle head
103: Shaping table
201: Sand mold

The invention claimed is:

1. A binder that is useful for a casting sand mold according to an ink jet type lamination shaping method, the binder comprising:
    a resol-type phenolic resin (R) having a ratio (Mw/Mn) of mass average molecular weight (Mw) to number average molecular weight (Mn) in a range of 1.0 or more and 3.5 or less, with a content of a phenolic monomer contained therein being in a range of 5% or less,
    wherein the resol-type phenolic resin (R) is obtained by reacting aldehydes (A1), phenols (P1), and a compound (N) having two or more phenolic hydroxyl groups in one molecule in the presence of an alkali catalyst (B1).

2. The binder according to claim 1,
    wherein the resol-type phenolic resin (R) is obtained by reacting the aldehydes (A1), the phenols (P1), and the compound (N) having two or more phenolic hydroxyl groups in one molecule in the presence of the alkali catalyst (B1), and the compound (N) is the novolac-type phenolic resin (N1) or a bisphenol (N2).

3. The binder according to claim 1,
    wherein the resol-type phenolic resin (R) is obtained by reacting the aldehydes (A1), the phenols (P1), and the compound (N) having two or more phenolic hydroxyl groups in one molecule in the presence of the alkali catalyst (B1), and a molar ratio (B1/P1) of the alkali catalyst (B1) to the phenolic resin (P1) is in a range of 0.01 or more and less than 0.4.

4. The binder according to claim 1,
    wherein the resol-type phenolic resin (R) is obtained by reacting the aldehydes (A1) and the novolac-type phenolic resin (N1) in the presence of the alkali catalyst (B1), and
    a molar ratio (B1/N1) the alkali catalyst (B1) to the novolac-type phenolic resin (N1) is in a range of 0.01 or more and less than 0.4.

5. The binder according to claim 1, further comprising:
    an organic solvent in addition to the resol-type phenolic resin (R).

6. The binder according to claim 2, further comprising:
    an organic solvent in addition to the resol-type phenolic resin (R).

7. The binder according to claim 3, further comprising:
    an organic solvent in addition to the resol-type phenolic resin (R).

8. The binder according to claim 4, further comprising:
    an organic solvent in addition to the resol-type phenolic resin (R).

* * * * *